(12) United States Patent
Yamato (10) Patent No.: US 10,360,266 B2
(45) Date of Patent: Jul. 23, 2019

(54) DATA-FLOW CONTROL DEVICE AND DATA-FLOW CONTROL METHOD (71) Applicant: OMRON Corporation, Kyoto-shi, Kyoto (JP)

(72) Inventor: Tetsuji Yamato, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/083,872

(22) PCT Filed: Jan. 10, 2017

(86) PCT No.: PCT/JP2017/000400
§ 371 (c)(1),
(2) Date: Sep. 10, 2018

(87) PCT Pub. No.: WO2017/159006
PCT Pub. Date: Sep. 21, 2017

(65) Prior Publication Data
US 2019/0095545 A1 Mar. 28, 2019

(30) Foreign Application Priority Data
Mar. 15, 2016 (JP) .................. 2016-051462

(51) Int. Cl.
*G06F 16/27* (2019.01)
*G06F 21/62* (2013.01)
*G06F 16/907* (2019.01)

(52) U.S. Cl.
CPC ........ *G06F 16/907* (2019.01); *G06F 21/6218* (2013.01); *G06F 16/27* (2019.01)

(58) Field of Classification Search
CPC ..... G06F 16/907; G06F 21/6218; G06F 16/27
See application file for complete search history.

(56) References Cited

U.S. PATENT DOCUMENTS 8,271,542 B1 * 9/2012 London .................. G06F 16/907
707/803
9,390,513 B2 * 7/2016 Jin ......................... H04L 65/602
(Continued)

FOREIGN PATENT DOCUMENTS

JP 2005-20271 A 1/2005
JP 2007-300571 A 11/2007
(Continued)

OTHER PUBLICATIONS

International Search Report of PCT/JP2017/000400 dated Feb. 21, 2017.
(Continued)

*Primary Examiner* — Mohamed Barakat
(74) *Attorney, Agent, or Firm* — Metrolex IP Law Group, PLLC (57) ABSTRACT

This data-flow control device has: a device-side metadata acquisition means that acquires device-side metadata for multiple devices; an application-side metadata acquisition means that acquires application-side metadata for an application that uses data provided by a device; a storage means that stores both types of metadata; a matching means that matches both types of metadata and extracts a combination; and a data-flow control means that, on the basis of the extracted combination, generates a data-flow control command specifying a device and an application. Each type of metadata includes permission information indicating whether to permit a combination with multiple pieces of other party metadata. On the basis of the permission information, the matching means decides whether to generate a combination with a single piece of other party metadata, or to generate a combination with multiple pieces of other party metadata.

10 Claims, 5 Drawing Sheets

(56) References Cited

U.S. PATENT DOCUMENTS

| 9,594,636 B2* | 3/2017 | Mortensen ............ G06F 16/178 |
| 2008/0164997 A1 | 7/2008 | Aritsuka et al. |
| 2014/0222866 A1* | 8/2014 | Joneja ............... G06F 17/30073 |
| | | 707/785 |
| 2014/0310800 A1* | 10/2014 | Kabra ..................... G06F 21/44 |
| | | 726/17 |
| 2015/0220659 A1* | 8/2015 | Rissanen ............ G06F 16/9032 |
| | | 707/759 |
| 2015/0242648 A1* | 8/2015 | Lemmey ................. G06F 21/62 |
| | | 726/30 |
| 2016/0149886 A1* | 5/2016 | Korokithakis .......... G06F 21/45 |
| | | 726/6 |
| 2016/0188895 A1* | 6/2016 | Liu ..................... G06F 21/6218 |
| | | 726/17 |

FOREIGN PATENT DOCUMENTS

| JP | 2009-8341 A | 1/2009 |
| JP | 5445722 B1 | 3/2014 |
| JP | 2015-226102 A | 12/2015 |

OTHER PUBLICATIONS

Written Opinion of PCT/JP2017/000400 dated Feb. 21, 2017.
English translation of the International preliminary report on patentability (IPRP) of PCT/JP2017/000400 dated Sep. 27, 2018.

* cited by examiner

(A) Sensor-side metadata table

| Sensor ID | Network address | Sensing target | Sensing place | Sensing time | Data type | Use range | Consideration | Data history | Multiple pair permission flag | Multiple pair permission number |
|---|---|---|---|---|---|---|---|---|---|---|
| R001 | ... | Outside air | In front of Kyoto station | 00:00-24:00 | Temperature | Business | at least 100 yen | aa1 produced by A company | ON | 5 |
| R002 | ... | Intersection | Tokyo, A intersection | 00:00- | Still image and moving image | Academic | At least 10 yen | xx1 produced by X company | OFF | 0 |
| ... | ... | ... | ... | ... | ... | ... | ... | ... | ... | ... |
| V001 | ... | Passing vehicle | Tokyo Road between A and B | 00:00-24:00 | Speed | Unlimited | At least 50 yen | yy1 produced by Y company | ON | 10 |
| ... | ... | ... | ... | ... | ... | ... | ... | ... | ... | ... |

(B) Application-side metadata table

| Application ID | Network address | Sensing target | Sensing place | Sensing time | Data type | Use range | Consideration | Data history | Multiple pair permission flag | Multiple pair permission number |
|---|---|---|---|---|---|---|---|---|---|---|
| A001 | ... | Outside air | In Kyoto city | 9:00 12:00 15:00 | Temperature | Business | 150 yen or less | — | OFF | 0 |
| A002 | ... | Outside air | In front of Kyoto station | 10:00 17:00 | Temperature | Business | 200 yen or less | aa1 produced by A company, aa2 produced by A company, bb1 produced by B company | OFF | 0 |
| ... | ... | ... | ... | ... | ... | ... | ... | ... | ... | ... |

Comparison target items

FIG. 3

Sensor information input

| | |
|---|---|
| Sensor ID | R001 |
| Network address | 10.45.55.11 |
| Sensing target | Outside air |
| Sensing place | In front of Kyoto station |
| Sensing time | 00:00 – 23:59 |
| Data type | Temperature |
| Use range | Business |
| Consideration | At least 100 yen |
| Data history | xx1 produced by X company |
| Pairing upper limit number | 5 |

Registration

DATA-FLOW CONTROL DEVICE AND DATA-FLOW CONTROL METHOD

TECHNICAL FIELD

The present invention relates to a technique of controlling a data flow that provides data obtained by a device such as a sensor to an application that uses the data.

BACKGROUND ART

An IT environment called M2M cloud currently attracts attention. Machine to Machine (M2M) indicates a system in which machines having various applications, sizes and performances exchange information over a network. Use of this information can properly control each machine, and analyze a status of a real world. Expectations for practical application are increasing due to improvement of wireless communication technology supporting M2M, miniaturization of a machine, cost reduction, and the like.

What is called M2M cloud is a technology that provides such an M2M technology on a cloud computing environment. A basic function necessary for M2M, such as data collection, accumulation, processing, and analysis, is provided as an application on the cloud, and is usable from anywhere. Reliability and coverage can be improved by collective management of data. For a user, there is an advantage that a required amount of collected data and computer resources can be used. Consequently, an added value can be obtained by analyzing big data without individually constructing a system, and application is expected in a wide range of fields.

As described in Patent Document 1, a technique called a sensor network is studied. Sensor devices (hereinafter, also simply referred to as a sensor) having a sensing function and a communication function are installed in various places, moving bodies, industrial facilities, and the like, and the sensor devices are networked, which allows collection, management, and seamless use of sensing data.

Usually, the sensor is installed to collect data required by an owner. For this reason, the sensor is not often used except when the owner collects the data (the sensor itself is not operated, or the sensing data is not used even if the sensor is operated). The sensing data has low distributability, and the sensing data is limited to the analysis and use by the sensor owner himself no matter how meaningful data for the third party. This leads to duplicate investment of facilities and network congestion by communication with sensors installed by each.

A technology called Internet of Things (IoT) is also studied. A new value is generated by combining pieces of information about many things existing in the world on the net, and seamless development of various services such as social infrastructure is expected. In order to create a value from IoT, it is necessary to know the state of things connected to the net, and sensing and communication are an important element technology.

PRIOR ART DOCUMENTS

Patent Documents

Patent document 1: Japanese Unexamined Patent Application Publication No. 2007-300571
Patent document 2: Japanese Patent No. 5445722

SUMMARY OF THE INVENTION

Problems to be Solved by the Invention

The applicant is extensively studying a technology for appropriately distributing information resource such as the sensing data in a sensor network. For example, a user who wants to provide the sensing data and a user who wants to use the sensing data are linked by appropriately matching data describing information about the sensor and data describing information about the application using the sensing data (see Patent Document 2).

Consequently, for example, the owner of the sensor can obtain a consideration by permitting the data user to temporarily use the sensor or providing the sensing data. For the user, investment for installing the sensor is unnecessary, so that there is an advantage that necessary data can be obtained at low cost.

In the invention described in Patent Document 2, the matching is performed using metadata corresponding to the sensor and metadata corresponding to the application using the sensing data, and a pair of the sensor and the application is generated.

From the viewpoint of profit, it is preferable for the sensing data providing side to provide data to more applications within capability of the sensor. It is sometimes preferable for the sensing data using side to collect information from a plurality of sensors in order to collect necessary data. However, in the invention described in Patent Document 2, it is impossible to properly control the number of combined other parties.

Although the sensor network is described as an example, the same problem may arise even in a network that distributes data output (provided) by a device other than the sensor. Examples of the device other than the sensor include an actuator, a controller, a computer, a household electric appliance, a wearable terminal, an automatic ticket gate, a bender machine, and ATM as long as the device outputs some kind of data. In the description, the term "device" is used as a concept encompassing these devices (including the sensor), and a network through which the data output (provided) by the device is distributed is referred to as a device network. Various types of devices exemplified above may be mixed and connected in the device network.

The present invention has been made in view of the above circumstances, and an object of the present invention is to control the number of combined other parties in the device network that generates the combination of the data provider and the data user.

Means for Solving the Problem

According to one aspect of the present invention, a data-flow control device includes: a device-side metadata acquisition unit that acquires device-side metadata indicating a specification of data that can be provided by a device for each of a plurality of devices; an application-side metadata acquisition unit that acquires application-side metadata indicating a specification of data requested by an application that uses the data provided by the device; a storage that stores the device-side metadata and the application-side metadata; a matching unit that extracts a combination of the application-side metadata corresponding to the application and the device-side metadata corresponding to the device that can provide the data satisfying the specification requested by the application by performing matching of the application-side metadata and the device-side metadata; and a data-flow controller that generates a data-flow control command specifying the device and the application extracted by the matching unit. The device-side metadata or the application-side metadata includes permission information that is information indicating whether to permit a combination with a plurality of pieces of other party metadata, and the matching unit determines whether to generate a combination with a single piece of other party metadata or a combination with a plurality of pieces of other party metadata based on the permission information included in the device-side metadata or the application-side metadata.

The permission information is the information indicating whether to permit generation of the combination with the plurality of pieces of other party metadata. For example, information indicating non-permission is set in the case that the combination only with a single other party is to be generated (that is, in the case that the pairing with two or more is not desired). The permission information may be set by the user who registers the metadata.

According to this configuration, in the combination of the pieces of metadata, whether a one-to-many combination or a one-to-one combination is generated can be controlled.

The permission information may include a maximum number of pieces of other party metadata which is permitted to be combined with a target metadata, and the matching unit may extract up to the maximum number of pieces of other party metadata that is a target of a combination with the target metadata.

In the case that the combining with the plurality of pieces of other party metadata is permitted, inconvenience may be generated unless an upper limit is set to the number of combinations. For example, on the device side, there is a risk of overloading due to pairing of the number of applications exceeding the processing capacity of the device. On the other hand, on the application side, there is a risk that excessive costs may be incurred because more than the necessary number of devices is paired. Thus, it is preferable that the matching unit performs the pairing within the range of the number set as the upper limit.

The matching unit may extract a combination generated as a result of the matching when a number of pieces of other party metadata obtained as a result of the matching is less than the maximum number, and reset a value in which the number of pieces of the obtained other party metadata is subtracted from the maximum number to the maximum number.

Contrary to the case described above, sometimes the required number of pieces of other party metadata is not found. In order to cope with such cases, in the case that the number of pieces of obtained other party metadata is less than the maximum number, resetting may be performed up to the number of pieces of obtained other party metadata. For example, when the maximum number is five and when only three pieces of metadata are paired, the maximum number may be updated to two. Consequently, the matching can be continued until the number of pieces of other party metadata reaches the number desired by the user.

The device may be a sensor that outputs the sensing data. The data-flow control device of the present invention can be suitably applied to a sensor network constructed with the data provider that provides the sensing data and the data user that uses the sensing data.

The present invention can be specified as a data-flow control device including at least a part of the above units. The present invention can also be specified as a device network system including the data-flow control device. The present invention can also be specified as a data-flow control method including at least a part of the pieces of above processing. The present invention can also be specified as a program causing a computer to perform the above method. The above pieces of processing and units can be freely combined and implemented as long as technical contradiction is not generated.

The device in the present invention means any device that outputs (provides) some kind of data, and examples of the device include a sensor, an actuator, a controller, a computer, a household electric appliance, a wearable terminal, an automatic ticket gate, a bender machine, and ATM. Among others, the present invention is suitable for a sensor network that distributes the sensing data output from the sensor.

Advantages of the Invention

According to the present invention, the number of combined other parties can be controlled in the device network that generates the combination of the data provider and the data user.

EMBODIMENT OF THE INVENTION

First Embodiment

Hereinafter, a preferred embodiment of the present invention will be described with reference to the drawings. The description of each component described below should be appropriately changed depending on a configuration of a system to which the present invention is applied and various conditions, and the scope of the present invention is not limited to the following description.

In the following embodiment, an example in which the present invention is applied to a sensor network system using M2M cloud will be described. When such a mechanism is constructed, anyone can easily acquire desired information from a variety of pieces of information obtained from a large number of sensors existing in a sensor network from anywhere, and effective use of the sensor (resource) and distribution of sensing data from a data provider to a data user are expected to be promoted. This system has various applications such as a traffic control system based on the sensing data of a traffic situation, a weather forecasting system based on the sensing data of an environment, various analysis system using big data, maintenance service of the sold sensor by a sensor manufacturer, and the like.

<Entire Configuration of System>

An entire configuration of a sensor network system according to a first embodiment of the present invention will be described with reference to FIG. 1. The sensor network system is a system that controls the distribution of the sensing data from the data provider to the data user. The sensor network system includes a sensor device 20 including a plurality of sensors 21 and a sensor network adapter 22 that is a device that manages the sensors 21, an application server 30 having an application that provides service using the sensing data, and a sensor network server 10 that is a data-flow control device that mediates between a provider of sensing data (hereinafter, referred to as a data provider) and a user (hereinafter, referred to as a data user). In the example, the sensor device 20 and the application server 30 are exemplified one by one, but a plurality of sensor devices 20 and a plurality of application servers 30 may be provided.

The devices are communicably connected to each other by a wide area network such as the Internet or a LAN. The network is not limited to a single network but may be considered as a conceptual one in which a plurality of networks having various communication schemes and topologies are connected to each other. That is, any form of network may be used as long as transmission and reception of the sensing data or transmission and reception of data such as metadata relating to the distribution of the sensing data and a data-flow control command can be provided.

«Sensor»

The sensor 21 detects a physical quantity to be sensed and a change in physical quantity, and outputs them as sensing data.

Examples of the sensor include an image sensor (such as a monitoring camera), a temperature sensor, a humidity sensor, an illuminance sensor, a force sensor, a sound sensor, an RFID sensor, an infrared sensor, a posture sensor, a rain sensor, a radiation sensor, a gas sensor, an acceleration sensor, a gyroscope, and a GPS sensor. Devices such as a mobile phone, a smart phone, a tablet terminal, a mobile PC, and a drone are equipped with various kinds of sensors, so that these devices can also be handled as a sensor. Any type of sensor including the exemplified sensors can be connected to the sensor network system of the embodiment. Many sensors have already been installed at every place in the world for various applications and purposes such as factory FA, production control, urban traffic control, meteorological environmental measurement, health care, and crime prevention, and these sensors can be connected to the sensor network system of the embodiment. The sensor network system may be constructed with only one type of sensor, or a plurality of types of sensors may be mixed in the sensor network system.

«Sensor Network Adapter»

The sensor network adapter 22 is connected to one or the plurality of sensors 21 so as to be able to communicate with the sensors 21 in a wired or wireless manner. The sensor network adapter 22 manages the sensor 21, acquires the sensing data from the sensor 21, and transmits the sensing data to the sensor network system or application. The sensor network adapter 22 may have a function of performing predetermined processing (for example, signal processing such as noise removal, a calculation such as averaging, sampling, data compression, and time stamp) on the sensing data. The sensor network adapter 22 has a function of communicating with an external device, and is capable of communicating with the application server 30, the sensor network server 10, and the like through a network.

Devices such as a smart phone, a tablet terminal, a mobile PC, a drone, and a wearable terminal are equipped with sensors such as an image sensor, a GPS sensor, an acceleration sensor, and a microphones, and have a function of processing and outputting data obtained by each sensor, and a network communication function. Thus, these devices are an example of a device in which the sensor 21 and the sensor network adapter 22 are physically integrated. In the case that the sensor 21 is equipped with a communication function, the sensor 21 can be connected to the sensor network system alone (that is, with no use of the sensor network adapter 22).

«Application Server»

The application server 30 is a server device in which various application programs providing service using the sensing data are installed. The application server 30 can be constructed with a general-purpose computer including a CPU (processor), a memory, an auxiliary storage device (HDD or the like), a communication device, an input device, and a display device. The application server 30 is installed by a user of the sensing data, and various applications are assumed according to use and purpose.

An application, in which a traffic jam map is generated by collecting a traffic condition at each point from the sensor installed on a road, an in-vehicle terminal mounted on a vehicle traveling on a road, or a smartphone of a driver, and provided to a business operator that uses traffic jam information, can be cited as an example of the application. A video distribution application that collects image data photographed during traveling with a smartphone or an in-vehicle camera and provides a situation at each point to the user, a traveling route search application that searches a traveling route of the vehicle based on the traffic jam information, an application that estimates statistical data of an attribute (such as gender and an age group) of a passer-by from video of a camera installed at specific locations and provides the statistical data as data for various surveys, and an application that a sensor makers performs on-line maintenance on the sold own sensor can also be cited as an example of the application.

«Sensor Network Server»

The sensor network server 10 is a server device that is responsible for matching between the provider of the sensing data and the user, data-flow control of the sensing data from the provider to the user, and the like. The sensor network server 10 is a specific example of the data-flow control device of the present invention. The sensor network server 10 can also be constructed with a general-purpose computer including a CPU (processor), a memory, an auxiliary storage device (HDD etc.), a communication device, an input device, and a display device. The CPU performs a necessary program to implement various functions of the sensor network server 10 (to be described later).

In the sensor network system, a large number (or various kinds of) sensors are networked to enable collection and use of sensing data. In the embodiment, it is assumed that the data provider (sensor 21) provides the sensing data to the data user (application server 30) to obtain a value. Consequently, the data provider obtains opportunities for revenue opportunities, and the user obtains acquisition of inexpensive data. The sensor network server 10 is a server device that mediates a transaction of the sensing data. The sensor network server 10 performs matching between the data provider and the data user to provide the proper distribution of the sensing data.

When the matching between the data provider and the data user is performed, it is not realistic to extract data matched with the desired condition of the data user from a huge amount of sensing data. For this reason, in this system, metadata (sensor-side metadata) describing the specifications, provision conditions and the like of the sensing data are prepared for all the sensors registered in the sensor network, and metadata (hereinafter, referred to as application-side metadata) describing a required specification, a use condition, and the like of the sensing data is used for applications that are the data user. The matching between the data provider (sensor) and the user (application) is properly performed by comparing the pieces of metadata to each other.

Figure 1:
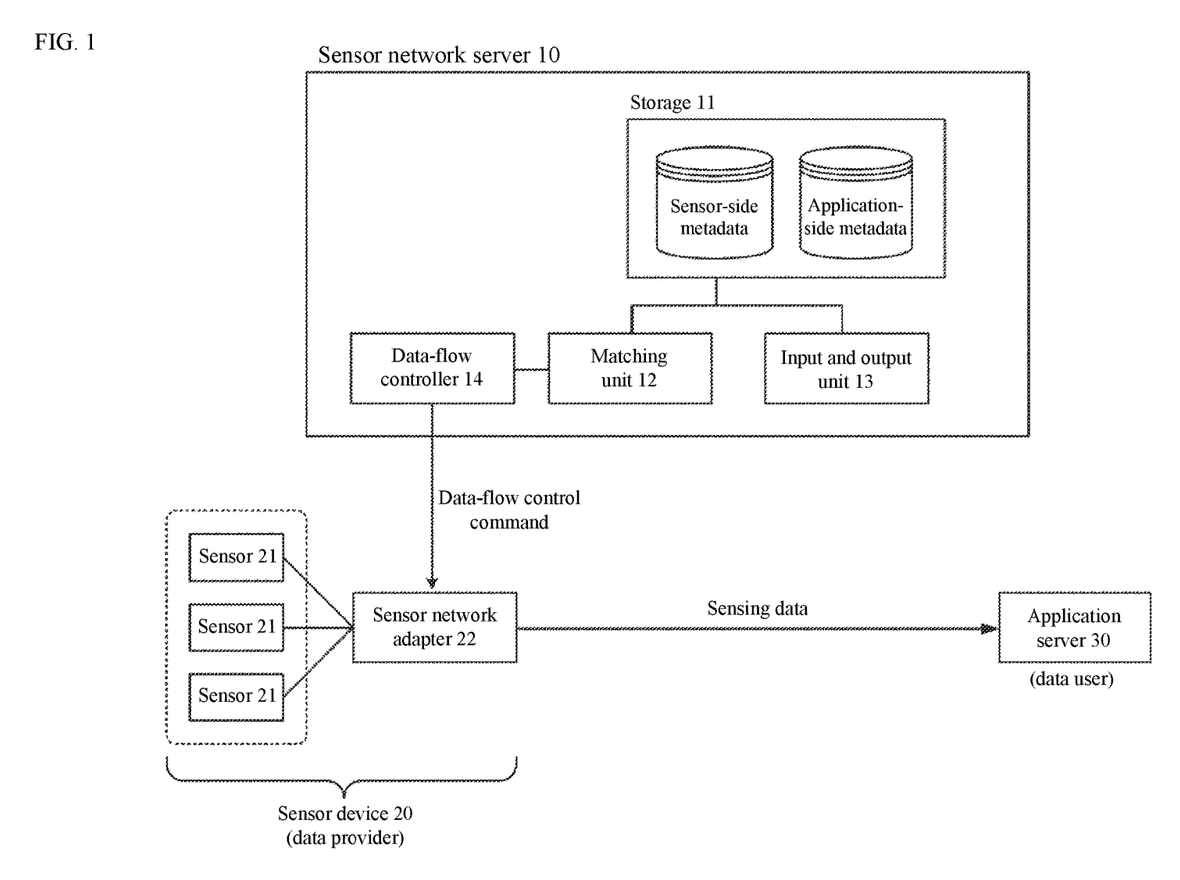
FIG. 1 is a block diagram illustrating a sensor network system according to an embodiment.

In the system configuration example of FIG. 1, the sensor network server 10 includes a storage 11, a matching unit 12, an input and output unit 13, and a data-flow controller 14.

The storage 11 is a database that storing the application-side metadata corresponding to all applications registered in the sensor network and the sensor-side metadata corresponding to all sensors registered in the sensor network.

The matching unit 12 performs the matching between the application-side metadata and the sensor-side metadata, which are registered in the storage 11, extracts the sensor capable of providing the sensing data satisfying an application request, and generates a pair of the sensor and the application (performs pairing).

Details of the processing performed by the matching unit 12 will be described later.

The input and output unit 13 is an interface that acquires the sensor-side metadata or application-side metadata of a registration target. The input and output unit 13 is hardware that communicates with an external computer through a wired or wireless connection. The input and output unit 13 may include a display device and a human interface device (such as a keyboard and a mouse). In this case, necessity of the communication with the external computer is eliminated. In either case, the information can be provided to the user through the input and output unit 13, or acquired from the user through the input and output unit 13.

The data-flow controller 14 is a function of generating and transmitting a data-flow control command instructing transmission of the sensing data based on the information output from the matching unit 12. Details of these functions will be described later.

<Sensor-Side Metadata>

The metadata stored in the storage 11 will be described in detail.

Figure 2:
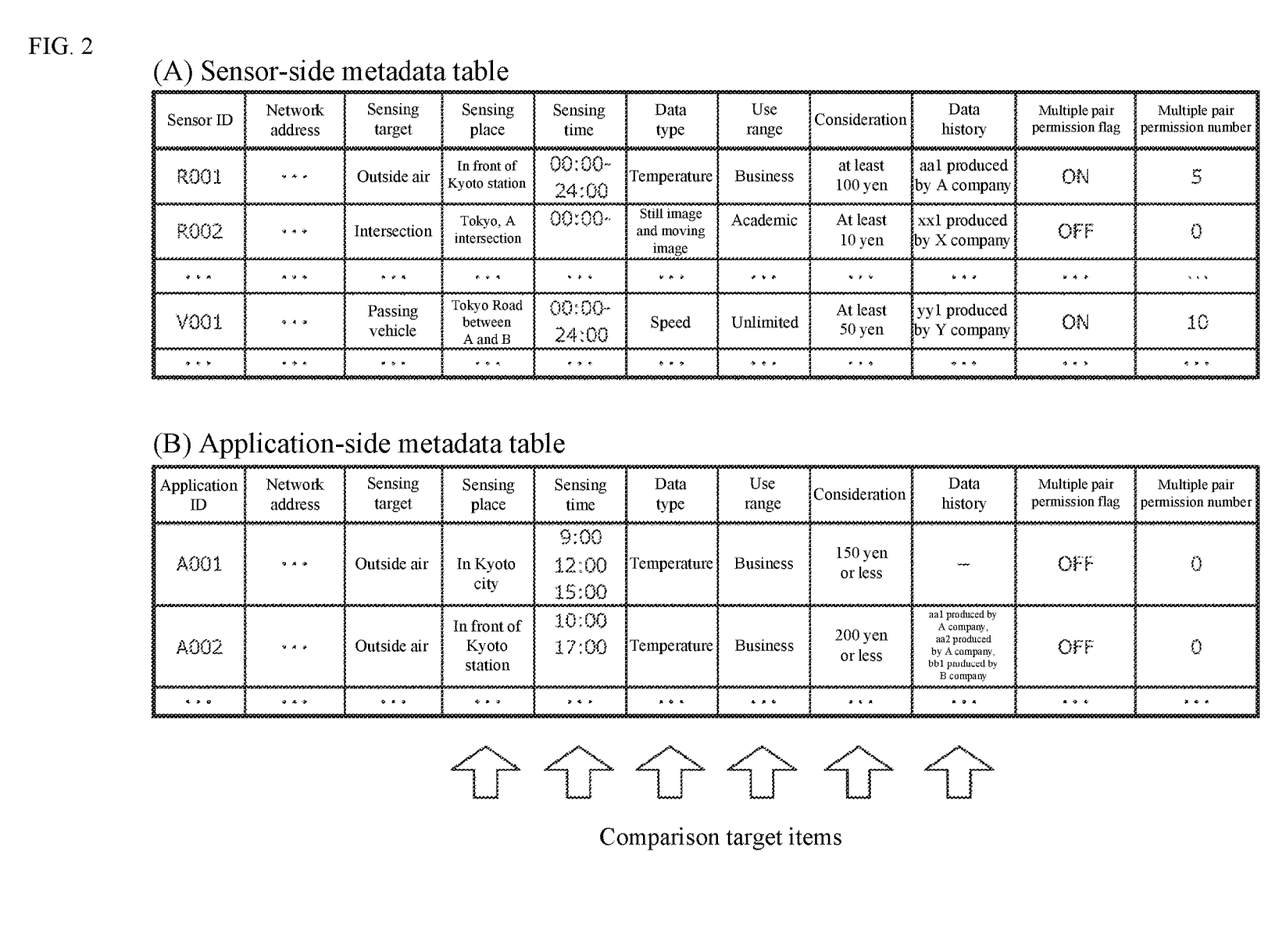
FIG. 2 is a view illustrating examples of sensor-side metadata and application-side metadata in the embodiment.

FIG. 2A illustrates an example of the sensor-side metadata stored in the storage 11 in a table form.

The sensor-side metadata is metadata describing attribute information about the sensor, information indicating a specification of the sensing data that the sensor can provide, information indicating the provision condition of the sensing data, and the like. For example, the attribute information about the sensor may include an ID identifying the sensor, a type of the sensor, a network address of the sensor, and an operation history of the sensor. For example, an IP address, a MAC address, and a Uniform Resource Identifier (URI) can be used as the network address. In the case that the sensor is connected to the network through the sensor network adapter 22, the network address of the sensor network adapter 22 may be set.

Examples of the information indicating the specification of the sensing data include a sensing target (that is, what to sense), a location and a region (for example, a position and a range) to be sensed, a sensing time (a time and a time zone at which the sensing data can be acquired), a data type (for example, an image, a moving image, and temperature) of the sensing data, a data format (for example, JPEG and text), a sensing condition (for example, a shutter speed, resolution, and a sampling period), and data reliability.

The information indicating the provision condition of the sensing data is information indicating the transaction condition desired by the data provider. Examples of the information indicating the provision condition of the sensing data include an ID identifying the data provider, a consideration (data providing price), and a usage range and a usage purpose (for example, commercial use unavailable, secondary available).

Information indicating the history of the sensing data (hereinafter, referred to as data history information) can be described in the sensor-side metadata. The data history information is information indicating derivation, details, a source, an origin, an identity, a history, establishment, a responsible person, etc. of the sensing data. Any kind of information may be used as the data history information as long as the information can become an objective material that determines accuracy, quality, reliability, safety, and the like of the sensing data.

A multiple pair permission flag is a flag indicating whether pairing with a plurality of pieces of application-side metadata is permitted with respect to the sensor-side metadata.

The multiple pair permission number field is a field in which the maximum number of pieces of application-side metadata to be paired is substituted when the multiple pair permission flag is set to ON. When the plural pair allowance flag is set to OFF, the multiple pair permission number becomes zero.

<Application-Side Metadata>

FIG. 2B illustrates an example of the application-side metadata stored in the storage 11 in the table form.

The application-side metadata is metadata describing attribute information about the application, information indicating the specification (required specification) of the sensing data requested by the application, information indicating the use condition of the sensing data, and the like.

For example, the attribute information about the application may include an ID identifying the application, a type of the application, and a network address of the application. For example, an IP address, and a port number can be used as the network address. Examples of the information indicating the required specification of the sensing data include a sensing target, an area to be sensed, a sensing time, a data type of the sensing data, a data format, a sensing condition, and data reliability.

The information indicating the use condition is information indicating the transaction condition desired by the data user. Examples of the information indicating the use condition include an ID identifying the data user, a consideration (upper limit of utilization price of the data), and a use range and a use purpose.

The data history information can also be described in the application-side metadata. A content of the data history information is identical to that of the information described in the sensor-side metadata, so that the description will be omitted. However, the data history information about the provided sensing data is described in the sensor-side metadata, whereas the data history information requested by the application is described in the application-side metadata. Thus, a plurality of pieces of data history information that permitted by the application can be described in the application-side metadata.

The application-side metadata also has the multiple pair permission flag field and the multiple pair permission number field.

The multiple pair permission flag is a flag indicating whether the pairing with a plurality of pieces of sensor-side metadata is permitted with respect to the application-side metadata.

The multiple pair permission number field is a field in which the maximum number of pieces of sensor-side metadata as another party to be paired is substituted when the multiple pair permission flag is set to ON. When the plural pair allowance flag is set to OFF, the multiple pair permission number becomes zero.

<Registration of Metadata>

When the data provider or the data user wishes to provide or use the data, an own computer is connected to the sensor network server 10 to input the content of the metadata. Specifically, access to the input and output unit 13 is obtained through the network, and the information is input according to the screen generated by the input and output unit 13. Consequently, the sensor-side metadata or the application-side metadata is generated and stored in the storage 11. In this example, the data provider generates the sensor-side metadata. However, but the same holds true for the case that the data user generates the application-side metadata.

Figure 3:
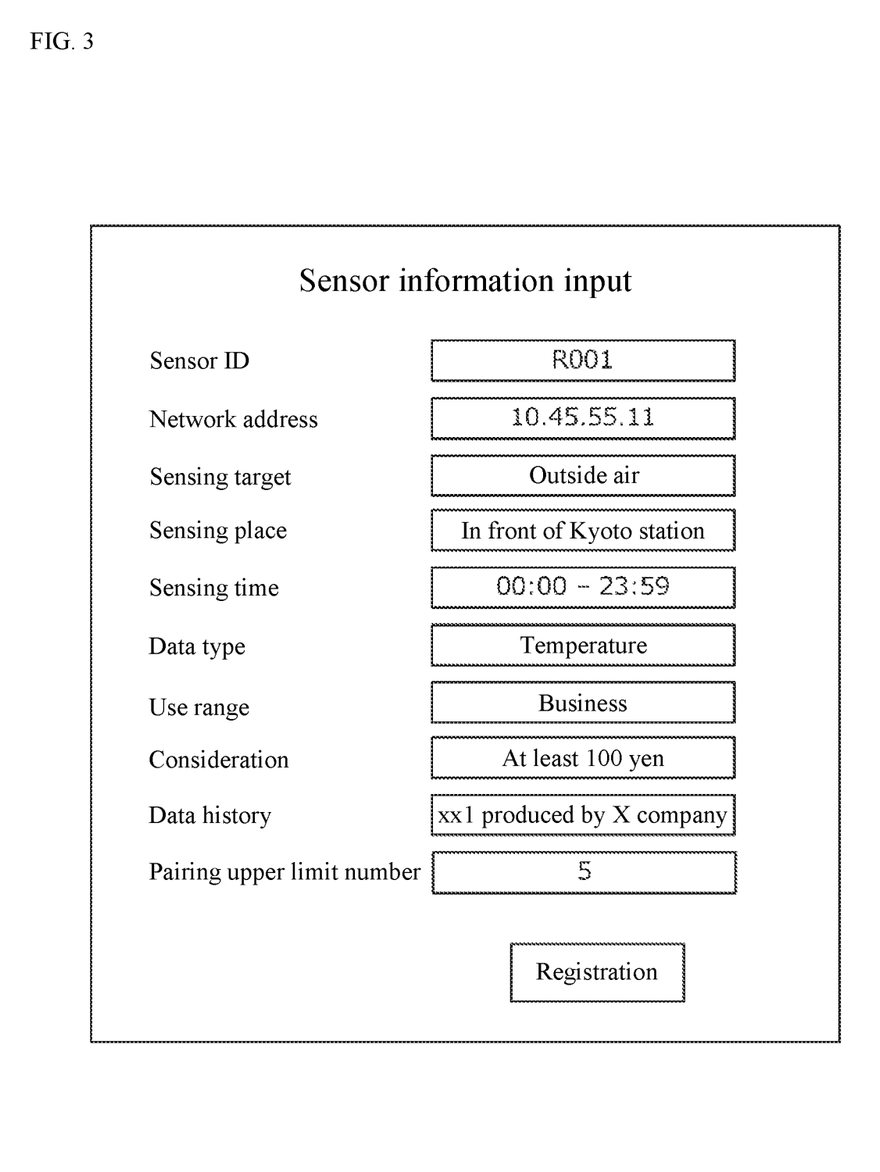
FIG. 3 is a view illustrating an example of a screen that registers the sensor-side metadata.

FIG. 3 illustrates an example of a screen that is displayed when the data provider newly registers the sensor-side metadata. The screen is generated by the input and output unit 13, and output to the computer of the data provider connected to the input and output unit 13.

In the first embodiment, a pairing upper limit number is set in entering a content of the metadata. The pairing upper limit number is an upper limit number for establishing a pair with other party side metadata. In the example of FIG. 3, five items are set to the pairing upper limit number. In this case, for example, when ten pieces of application-side metadata are hit as a result of performing matching between pieces of metadata, the pairs are generated up to five pairs. Although the example of FIG. 3 is an example in which the sensor-side metadata is input, the same holds true for the case that the application-side metadata is input.

When the pairing upper limit number is too large, processing capacity of the sensor may be exceeded, a consideration paid by the data user may exceed an assumed value, or traffic of the network may be excessive. Thus, the pairing upper limit number is preferably set to a proper value.

When the user who inputs information presses the registration on the screen in FIG. 3, the inputted metadata is registered as the sensor-side metadata in the storage 11. At this point, the multiple pair permission flags and the multiple pair permission number are set according to the set pairing upper limit number.

Specifically, the multiple pair permission flag is set to OFF in the case that the pairing upper limit number is zero, and the multiple pair permission flag is set to ON in the case that the pairing upper limit number is 1 or more. The input pairing upper limit number is set to the multiple pair permission number.

<Matching Processing>

The matching is processing performed by the matching unit 12, and in processing of comparing the application-side metadata registered in the storage 11 to the sensor-side metadata registered in the storage 11, extracting items in which the conditions are matched with each other to pair with each other, and issuing an instruction controlling the data-flow control command of the sensing data from the corresponding sensor to the application. The matching is performed when the metadata is newly registered.

Figure 4:
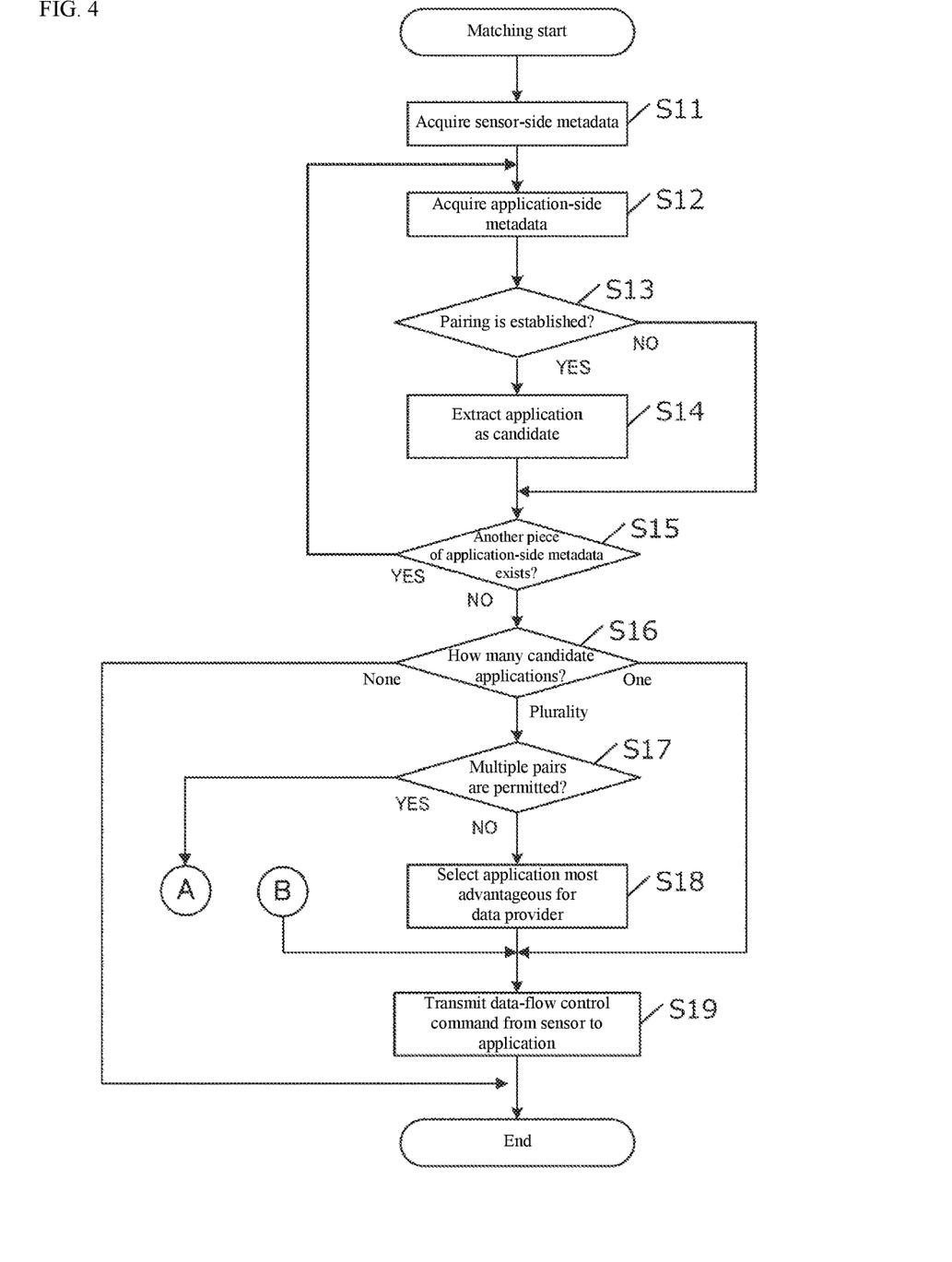
FIG. 4 is a flowchart of matching processing.

FIG. 4 is a flowchart illustrating matching processing that is performed when the sensor-side metadata is registered.

The sensor-side metadata waiting for the processing is acquired one by one from a sensor-side metadata table owned by the storage 11 (step S11).

One piece of application-side metadata is acquired from the application-side metadata table of the storage 11 (step S12).

Whether the specification and the transaction condition (provision condition) of the sensing data specified by the application-side metadata satisfy the request specification and the transaction condition (use condition) of the sensing data specified by the sensor-side metadata is determined. The pair is established when the comparison target items of the sensor-side metadata and the application-side metadata are matched with each other, and the pair is not established when the comparison target items are not matched with each other (step S13).

Whether the conditions are matched with each other is not necessarily determined by complete matching in wording. For example, when the sensing location is "in Kyoto city" on the sensor side and when the sensing location is "in front of Kyoto station" on the application side, it is determined that the sensing locations are matched with each other.

For example, the sensor ID of R001 in FIG. 2 is considered. In the example of FIG. 2, the six items of the sensing location, the sensing time, the data type, the use range, the consideration, and the data history are the comparison target items, so that the conditions of the sensor ID of R001 and the application IDs of A001 and A002 are match with each other. That is, two pairs of R001 and A001 and R001 and A002 are established.

When the pairing is established in step S13, the application-side metadata acquired in step S12 is extracted as one of the final pair candidates (step S14).

The pieces of processing in steps S12 to S14 are performed for all the pieces of application-side metadata registered in the application-side metadata table (step S15).

In step S16, the number of pieces of application-side metadata extracted as the candidate is determined.

When the plurality of application-side metadata extracted as the candidate exist, the matching unit 12 determines whether the target sensor-side metadata permits the multiple pairs (step S17).

The case that the target sensor-side metadata does not permit the multiple pairs will be described first (NO in step S17). In this case, the candidate that is most advantageous for the data provider is selected from the plurality of candidates (step S18). For example, for a consideration priority, the application-side metadata having the highest data price may be selected. What criteria the application most advantageous to the data provider is selected can appropriately be set.

For no application-side metadata extracted as the candidate, the processing may be ended, or the application-side metadata closest to the data specification, the transaction condition, or the data history information may be recommended. After a predetermined time elapses, the processing in FIG. 4 may be performed again.

Finally, the data-flow controller 14 generates the data-flow control command issuing the instruction to transmit the sensing data to the target sensor, and transmits the data-flow control command to the sensor network adapter 22 that manages the sensor 21 (Step S19).

As illustrated in FIG. 1, the sensor network adapter 22 acquires the necessary sensing data from the sensor 21 based on the data-flow control command, and transmits the sensing data to the corresponding application server 30.

The data-flow control command includes a data-flow control command ID, information identifying the sensor (a sensor ID, a sensor network address), information identifying the application (an application ID, an application network address), and information about time the data is transmitted. However, the data-flow control command may include other pieces of information.

Figure 5:
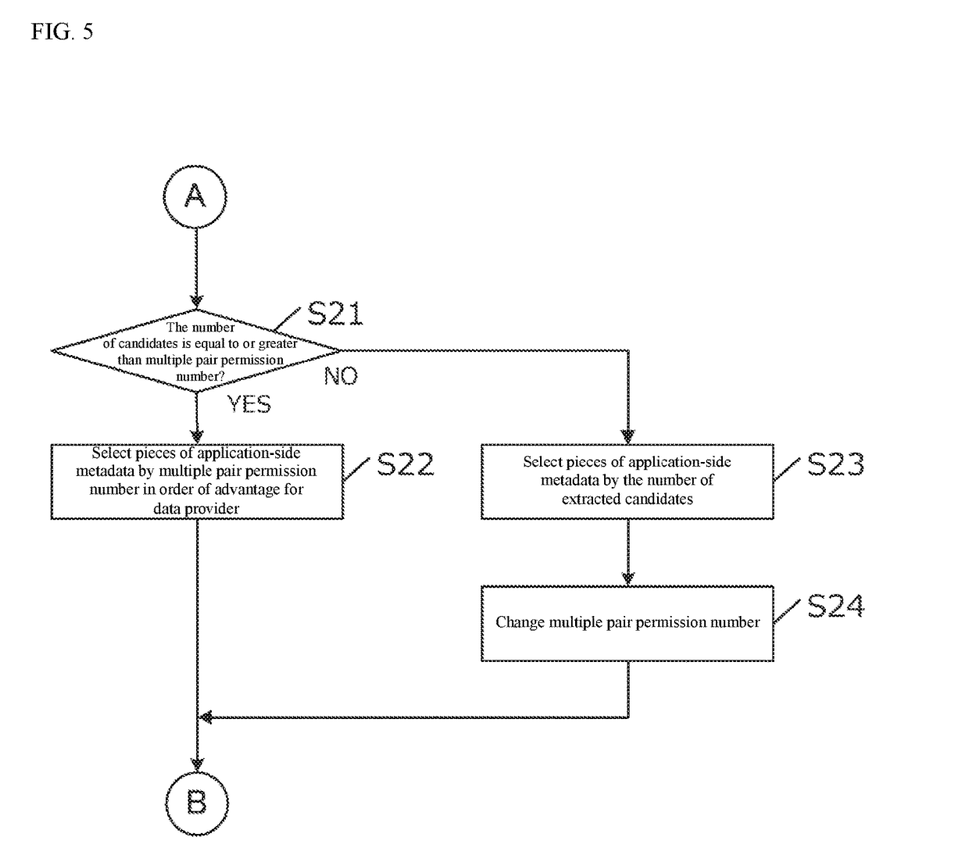
FIG. 5 is a flowchart of matching processing.

The processing when the target sensor-side metadata permits the multiple pairs will be described below with reference to FIG. 5 (YES in step S17).

In step S21, it is determined whether the number of pieces of application-side metadata extracted as the candidate is equal to or greater than the multiple pair permission number of the sensor-side metadata of the processing target. As a result, when the number of pieces of application-side metadata is equal to or greater than the multiple pair permission number, the pieces of application-side metadata are selected by the number of pieces of application-side metadata in order of the advantage for the data provider (step S22). For example, when the number of permissible pairs is five and when the number of extracted candidates are ten, five pairs of the sensor-side metadata and the application-side metadata are established. The data-flow control command for the corresponding application is generated and transmitted to the target sensor device (step S19).

On the other hand, when the number of pieces of application-side metadata extracted as the candidate is less than the multiple pair permission number of the sensor-side metadata of the processing target in step S21 (for example, the number of permissible pairs is five and the number of extracted candidates is two), the pieces of application-side metadata are selected by the number of extracted candidates (step S23). As a result, two pairs of the sensor-side metadata and the application-side metadata are established.

In this case, the number of pieces of paired application-side metadata is less than the multiple pair permission number, so that it is preferable to wait for the establishment of more pairs. For this reason, in the first embodiment, the multiple pair permission number of the corresponding sensor-side metadata is changed to a remaining number that can be paired in step S24. For example, when two pairs are established while the multiple pair permission number is five, the remaining three pairs can be generated. The multiple pair permission number of the corresponding sensor-side metadata is changed to three. Consequently, it can be expected that more pairs will be established through the matching processing performed in different timing. When the number of pairs is less than the multiple pair permission number, step S24 may be omitted.

As described above, in the first embodiment, a flag indicating whether the pairing with a plurality of pieces of other side metadata is permitted is added to the sensor-side metadata and the application-side metadata, and the specific upper limit is set. The pairing of the pieces of metadata is performed based on the information. Consequently, in the pairing of the pieces of metadata, whether a one-to-many combination or a one-to-one combination is generated can be controlled, and the convenience of the user is greatly improved.

In the first embodiment, the candidate of the other party metadata is selected based on the advantage for the data provider in steps S18 and S22. However, the method is an example, and the candidate may be selected based on another condition.

(Modifications)

The configuration of the above embodiment is merely one example of the present invention, but is not intended to limit the scope of the present invention. The present invention can adopt various concrete configurations without departing from the technical idea thereof. For example, the data structure and table structure of the above embodiment are an example, and the items may be added or replaced as appropriate.

In the description of the embodiment, by way of example, the matching processing in FIG. 4 is performed with the fact that the sensor-side metadata is newly registered as a trigger. However, the matching processing may be performed with the fact that the application-side metadata is newly registered as a trigger. In this case, the sensor and the application, and the data provider and the data user may be replaced. In the description of the embodiment, the matching processing is performed in timing of registering the metadata, but the matching processing may periodically be performed.

The sensor-side metadata and the application-side metadata in which the pair is established may be deleted from the storage 11, or a flag indicating that the contract is established is attached and the sensor-side metadata and the application-side metadata may be removed from the matching until the contract is canceled.

In the above embodiment, the distribution of the sensing data in the sensor network is exemplified. The present invention is also applicable to the distribution of the data in a device network including a device other than the sensor. Also in that case, the basic configuration of the system is similar to that of the above embodiment, and the sensor in the above embodiment may be read as the device and the sensing data may be read as the data.

The technical idea disclosed in the description can also be specified as the following invention.

(Additional Remark 1)

A data-flow control device comprising: a memory; and at least one hardware processor connected to the memory, wherein the memory includes:

a device-side metadata storage that stores device-side metadata indicating a specification of data that can be provided by a device for each of a plurality of devices; and an application-side metadata storage that stores application-side metadata indicating a specification of data requested by an application that uses the data provided by the device, the at least one hardware processor extracts a combination of the application-side metadata corresponding to the application and the device-side metadata corresponding to the device that can provide the data satisfying the specification requested by the application by performing matching of the application-side metadata and the device-side metadata, and generates a data-flow control command specifying the extracted device and application, the device-side metadata or the application-side metadata includes permission information that is information indicating whether to permit a combination with a plurality of pieces of other party metadata, and in the extraction, whether to generate a combination with a single piece of other party metadata or a combination with a plurality of pieces of other party metadata is determined based on the permission information included in the device-side metadata or the application-side metadata.

(Additional Remark 2)

A data-flow control method causing at least one hardware processor to perform:

a device-side metadata acquisition step of acquiring device-side metadata indicating specifications of data that the device can provide for each of the plurality of devices;

an application-side metadata acquisition step of acquiring application-side metadata indicating a specification of data requested by an application that uses data provided by the device;

a storage step of storing the device-side metadata and the application-side metadata;

a matching step of extracting a combination of the application-side metadata corresponding to the application and the device-side metadata corresponding to the device that can provide the data satisfying the specification requested by the application by performing matching of the application-side metadata and the device-side metadata; and a data-flow control step of generating a data-flow control command specifying the device and application extracted in the matching step, wherein the device-side metadata or the application-side metadata includes permission information that is information indicating whether to permit a combination with a plurality of pieces of other party metadata, and the matching step includes determining whether to generate a combination with a single piece of other party metadata or a combination with a plurality of pieces of other party metadata based on the permission information included in the device-side metadata or the application-side metadata.

DESCRIPTION OF REFERENCE SIGNS

10: sensor network server
11: storage
12: matching unit
13: input and output unit
14: data-flow controller
20: sensor device
21: sensor
22: sensor network adapter
30: application server

The invention claimed is:

1. A data-flow control device comprising:
a memory; and
at least one processor connected to the memory,
wherein the processor is configured with a program to perform operations comprising:
acquiring device-side metadata indicating a specification of data capable of being provided by a device for each device of a plurality of devices;
acquiring application-side metadata indicating a specification of data requested by an application that uses the data provided by the device;
storing the device-side metadata and the application-side metadata in the memory;
extracting a combination of the application-side metadata corresponding to the application and the device-side metadata corresponding to the device capable of providing the data satisfying the specification of the data requested by the application by performing matching of the application-side metadata and the device-side metadata; and
generating a data-flow control command specifying the device corresponding to the extracted device-side metadata and the application corresponding to the extracted application-side metadata,
the device-side metadata or the application-side metadata comprises permission information indicating whether to permit the combination of the device-side metadata or the application-side metadata respectively with a plurality of pieces of other party metadata, and
the processor is configured with the program to perform operations such that extracting the combination of the application-side metadata corresponding to the application and the device-side metadata corresponding to the device further comprises determining whether to generate the combination of the device-side metadata or the application-side metadata with a single piece of the plurality of pieces of the other party metadata or the combination of the device-side metadata or the application-side metadata with the plurality of pieces of the other party metadata based on the permission information comprised in the device-side metadata or the application-side metadata.

2. The data-flow control device according to claim 1, wherein
the permission information comprises a maximum number of pieces of the other party metadata which is permitted to be combined with a target metadata, and
the processor is configured with the program to perform operations such that extracting the combination of the application-side metadata corresponding to the application and the device-side metadata corresponding to the device further comprises extracting up to the maximum number of pieces of the other party metadata that is a target of the combination with the target metadata.

3. The data-flow control device according to claim 2, wherein the processor is configured to extract such that extracting the combination of the application-side metadata corresponding to the application and the device-side metadata corresponding to the device further comprises extracting the combination generated as a result of the matching in response to a number of pieces of the other party metadata obtained as the result of the matching being less than the maximum number of pieces of the other party metadata, and reset a value in which the number of pieces of the obtained other party metadata is subtracted from the maximum number of pieces of the other party metadata to the maximum number of pieces of the other party metadata.

4. The data-flow control device according to claim 1, wherein the device comprises a sensor that outputs sensing data.

5. The data-flow control device according to claim 2, wherein the device comprises a sensor that outputs sensing data.

6. The data-flow control device according to claim 3, wherein the device comprises a sensor that outputs sensing data.

7. The data-flow control device according to claim 1, wherein the permission information comprises a flag indicating whether to permit the combination with the plurality of pieces of the other party metadata.

8. The data-flow control device according to claim 2, wherein the permission information comprises a flag indicating whether to permit the combination with the plurality of pieces of the other party metadata.

9. A data-flow control method, comprising:
acquiring device-side metadata indicating specifications of data capable of being provided by a device for each device of a plurality of devices;
acquiring application-side metadata indicating a specification of data requested by an application that uses the data provided by the device;
storing the device-side metadata and the application-side metadata;
extracting a combination of the application-side metadata corresponding to the application and the device-side metadata corresponding to the device capable of providing the data satisfying the specification of the data requested by the application by performing matching of the application-side metadata and the device-side metadata; and
generating a data-flow control command specifying the device corresponding to the extracted device-side metadata and the application corresponding to the extracted application-side metadata in the matching, wherein the device-side metadata or the application-side metadata comprises permission information indicating whether to permit the combination of the device-side metadata or the application-side metadata respectively with a plurality of pieces of the other party metadata, the matching comprises determining whether to generate the combination of the device-side metadata or the application-side metadata with a single piece of the plurality of pieces of the other party metadata or the combination of the device-side metadata or the application-side metadata with the plurality of pieces of the other party metadata based on the permission information comprised in the device-side metadata or the application-side metadata, and the method is performed by a computer.

10. A non-transitory computer readable storage medium storing a program, which when read and executed, causes a computer to perform operations comprising:

acquiring device-side metadata indicating specifications of data capable of being provided by a device for each device of a plurality of devices;

acquiring application-side metadata indicating a specification of data requested by an application that uses the data provided by the device;

storing the device-side metadata and the application-side metadata;

extracting a combination of the application-side metadata corresponding to the application and the device-side metadata corresponding to the device capable of providing the data satisfying the specification of the data requested by the application by performing matching of the application-side metadata and the device-side metadata; and generating a data-flow control command specifying the device corresponding to the extracted device-side metadata and the application corresponding to the extracted application-side metadata in the matching, wherein the device-side metadata or the application-side metadata comprises permission information indicating whether to permit the combination of the device-side metadata or the application-side metadata respectively with a plurality of pieces of the other party metadata, and the matching comprises determining whether to generate the combination of the device-side metadata or the application-side metadata with a single piece of the plurality of pieces of the other party metadata or the combination of the device-side metadata or the application-side metadata with the plurality of pieces of the other party metadata based on the permission information comprised in the device-side metadata or the application-side metadata.

* * * * *